United States Patent [19]

Murphy, Jr.

[11] 4,111,188
[45] Sep. 5, 1978

[54] EXTRUDED METAL SOLAR COLLECTOR ROOFING SHINGLE

[76] Inventor: John A. Murphy, Jr., 7273 N. Central Ave., Phoenix, Ariz. 85020

[21] Appl. No.: 827,417

[22] Filed: Aug. 24, 1977

Related U.S. Application Data

[63] Continuation-in-part of Ser. No. 712,291, Apr. 6, 1976, abandoned.

[51] Int. Cl.² ............................................. F24J 3/02
[52] U.S. Cl. .................................. 126/271; 126/270; 52/536; 52/553
[58] Field of Search .............. 126/270, 271; 237/1 A; 52/536, 553, 588

[56] References Cited

U.S. PATENT DOCUMENTS

| | | | |
|---|---|---|---|
| 2,625,930 | 1/1953 | Harris | 237/1 A |
| 3,893,506 | 7/1975 | Laing | 237/1 A |
| 3,935,897 | 2/1976 | Pulver | 126/270 |
| 3,989,032 | 11/1976 | Harrison | 237/1 A |

FOREIGN PATENT DOCUMENTS

| | | | |
|---|---|---|---|
| 2,309,307 | 8/1974 | Fed. Rep. of Germany | 126/271 |
| 282,024 | 7/1952 | Switzerland | 126/271 |

Primary Examiner—Kenneth W. Sprague
Assistant Examiner—James C. Yeung
Attorney, Agent, or Firm—Sughrue, Rothwell, Mion, Zinn and Macpeak

[57] ABSTRACT

An extruded aluminum planar roofing shingle with a structural capability of spanning over six feet which incorporates an integral tube which projects from its lower surface, the shingles being mounted in edge overlapping, parallel array fashion across laterally spaced, inclined roof rafters of a building structure and being interlocked at said edges, each shingle extending the full length of the roof. Preferably, a light transmissive plate of a size corresponding generally to that of the shingle is carried by each shingle on the upper surface of the shingle and spaced therefrom to enhance heating of the extruded aluminum shingle and collection of solar heat thereby. A second layer may also be applied in such a manner that there is an insulation air space between each layer of the light transmissive plate.

16 Claims, 5 Drawing Figures

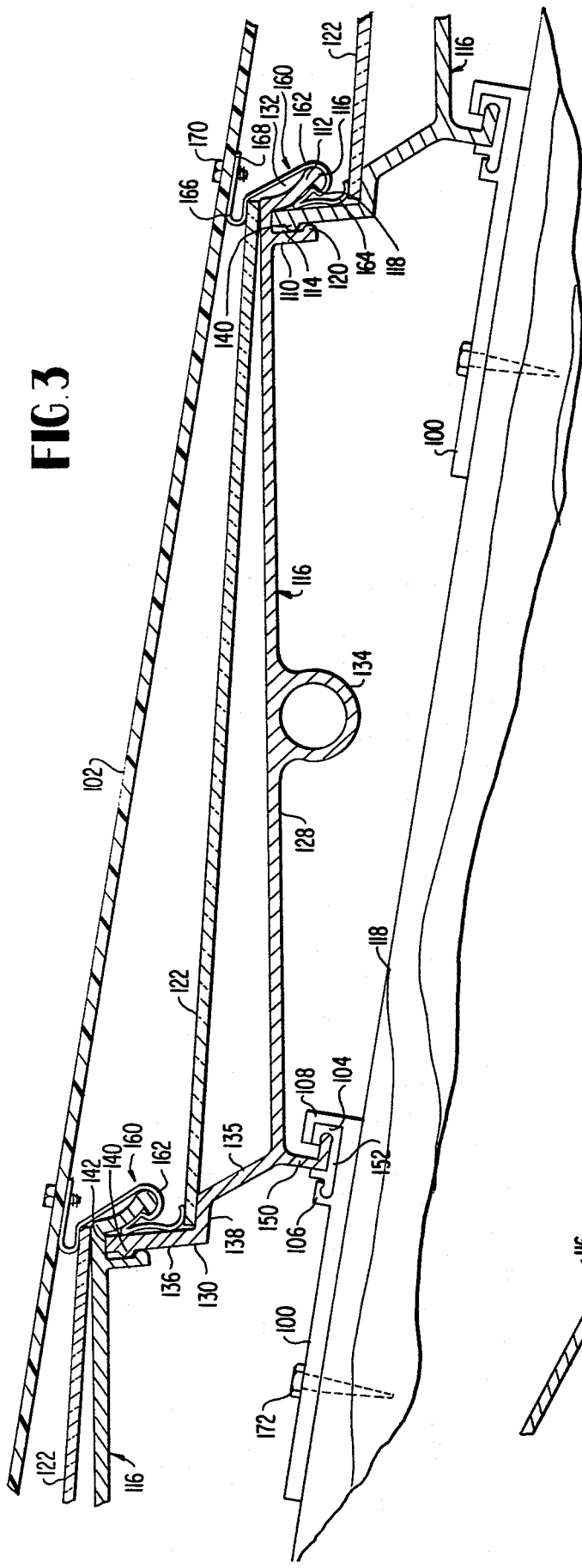
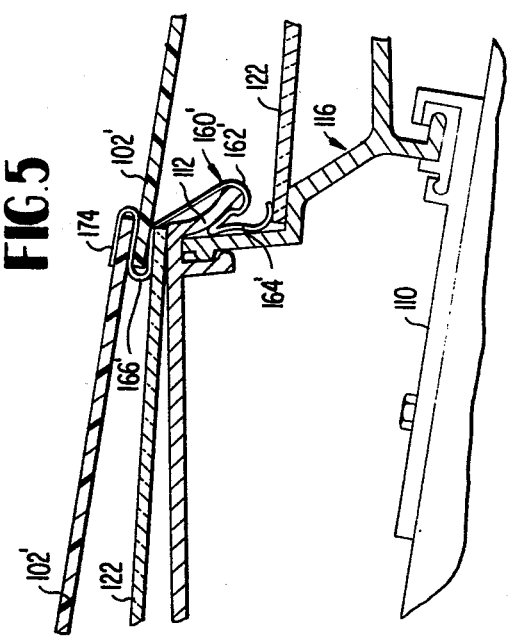
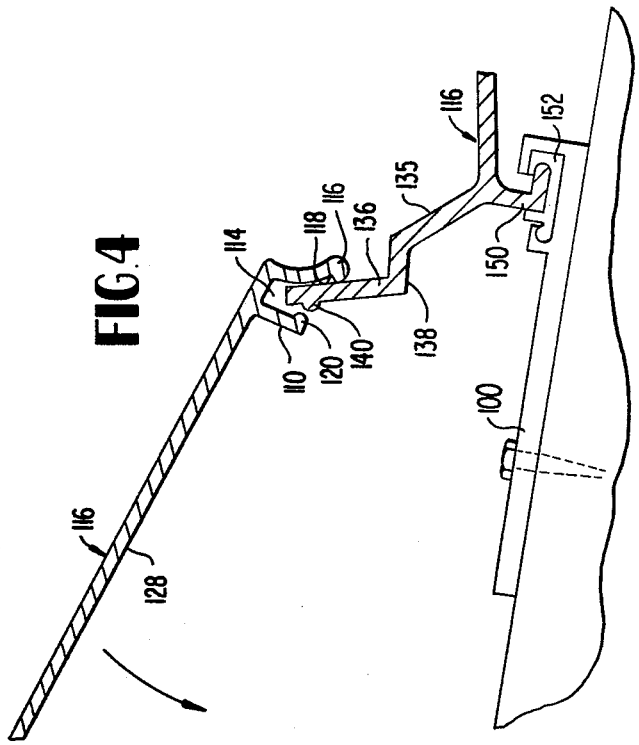

EXTRUDED METAL SOLAR COLLECTOR ROOFING SHINGLE

This application is a continuation-in-part of application Ser. No. 712,291, filed Apr. 6, 1976, by the same inventor, now abandoned.

BACKGROUND OF THE INVENTION

Field of the Invention

This invention relates to extruded metal roofing shingles and more particularly to such roofing shingles employed as solar collectors.

The home building field has long employed extruded metal siding sheets or strips to form the exterior siding of home dwelling units with the extruded aluminum strips being nailed or otherwise mounted to the exterior walls of the building in edge overlapping fashion in the form of conventional wooden strip siding. The acceptability and general use of extruded aluminum siding is primarily due to the fact that the painted or otherwise coated sheet metal siding requires minimal maintenance and virtually eliminates the necessity for periodic painting of the house exterior.

SUMMARY OF THE INVENTION

The present invention employs extruded aluminum or other metal roof shingles for the collection of solar heat by the roof shingles being mounted preferably directly to laterally spaced inclined roof rafters of a building structure in multiple shingle, edge overlapping fashion as a parallel array extending longitudinally of the building and at right angles to the rafters. They may also be installed in opposite direction extending from the crest of the roof to the eave. Each shingle comprises an elongated planar sheet portion having upper and lower surface facing outwardly of the building. Integral fluid conduit means are provided within the sheet portion and protrude from the lower surface and inclining the lower edge of the planar sheet portion of the shingle away from the roof rafters. The opposed lateral edges of the shingles carry interlock means such that the shingles are interlocked to each other.

A light transmissive plate, preferably transparent, of a size generally equal to that of a shingle, is mounted to the upper surface of the shingle and spaced therefrom to reduce the loss of heat resulting from radiation, convection, and conduction. A second light transmissive plate may also be placed over the first plate in such a manner that the loss of heat is further reduced.

In one form of the invention, the upper edge of the shingle preferably includes a first right angle projection which projects outwardly of the upper surface of the shingle and carries a groove facing the lower edge, one edge of the light transmissive plate is inserted within the groove of the projection and the other edge of the plate is clipped to the lower edge of the shingle to maintain the light transmissive plate mounted to the shingle and inclined to the planar sheet portion to form a triangular shaped cavity in longitudinal cross-section therebetween. The first projection on the outer surface of the upper edge at the upper edge of the shingle is preferably F-shaped including upper and lower ledges, and the lower edge of the shingle is reversely bent towards the lower surface of the shingle planar sheet portion forming an elongated slot. The interlock is formed by the upper ledge of the F-shaped vertical projection being received within the elongated slot formed by the reverse bend of the adjacent shingle and with the reversely bent lower edge of the shingle pressing the edge of the light transmissive plate against the lower flange of the F-shaped projection. A U-shaped metal clip or strip clamps to the lower edge of each shingle and has a side which resiliently overlies the edge of the light transmissive plate to press it against the lower edge of the shingle planar sheet portion adjacent the reverse bend of the same. In this form of the invention, the upper edge of the planar sheet portion of each shingle terminates in a second projection in the form of a projecting lip and metal clips mounted to the rafters.

In a second form of the invention, the solar collector roofing shingles are mechanically interlocked at their edges by utilizing an outwardly directed projection on the upper edge, the upper edge projection including a lateral offset intermediate of its ends to define a shelf for receiving the upper edge of the light transmissive plate. The lower edge of the shingle terminates in a laterally spaced, downwardly directed projection defining a channel which receives the upper edge projection of the succeeding shingle. The lower edge of the light transmissive plate rests on the shingle lower edge upper surface and a unitary spring clip frictionally presses the outermost lower edge projection to the light transmissive plate lower edge and includes a portion in contact with the upper surface of the upper edge of the succeeding light transmissive plate to resiliently press that edge of the plate against the shelf of the upper edge projection of the succeeding shingle.

The channel on the lower edge of the shingle includes on the upper projection a rounded lip which projects towards the other projection defining the channel, and the outwardly directed projection at the upper edge of the succeeding shingle includes a protruding ridge facing the rounded lip such that as the edge of the shingle nearest to the crest of the roof is lowered, the rounded ridge on the top protrusion interlocks above the rounded lip of the protrusion on the smaller projection at the lower end of the top shingle. The projecting lip at the lower end of the shingle extends a sufficient distance to prevent water from working back into the interlock area by capillary action. Further, the lip terminates at a notch which facilitates the securing of the spring steel clip which presses the upper end of the succeeding transparent plate and the lower end of the light transmissive plate against the shingle at that point. The spring clip may be employed in mounting a fiberglass reinforced plastic glazing sheet to the roofing structure spaced a short distance from the collector plate and from the collector light transmissive plate.

BRIEF DESCRIPTION OF THE DRAWINGS

FIG. 3 is a sectional view of part of a building roof structure employing the extruded metal solar collector roofing shingles in a second form of the present invention.

FIG. 4 is a sectional view of a portion of the roof structure of FIG. 3 showing the mechanical interlock between the solar collector roofing shingles of that embodiment.

FIG. 5 is a sectional view of a portion of a building roof structure constituting a further embodiment of the present invention.

DESCRIPTION OF THE PREFERRED EMBODIMENT

Figure 1:
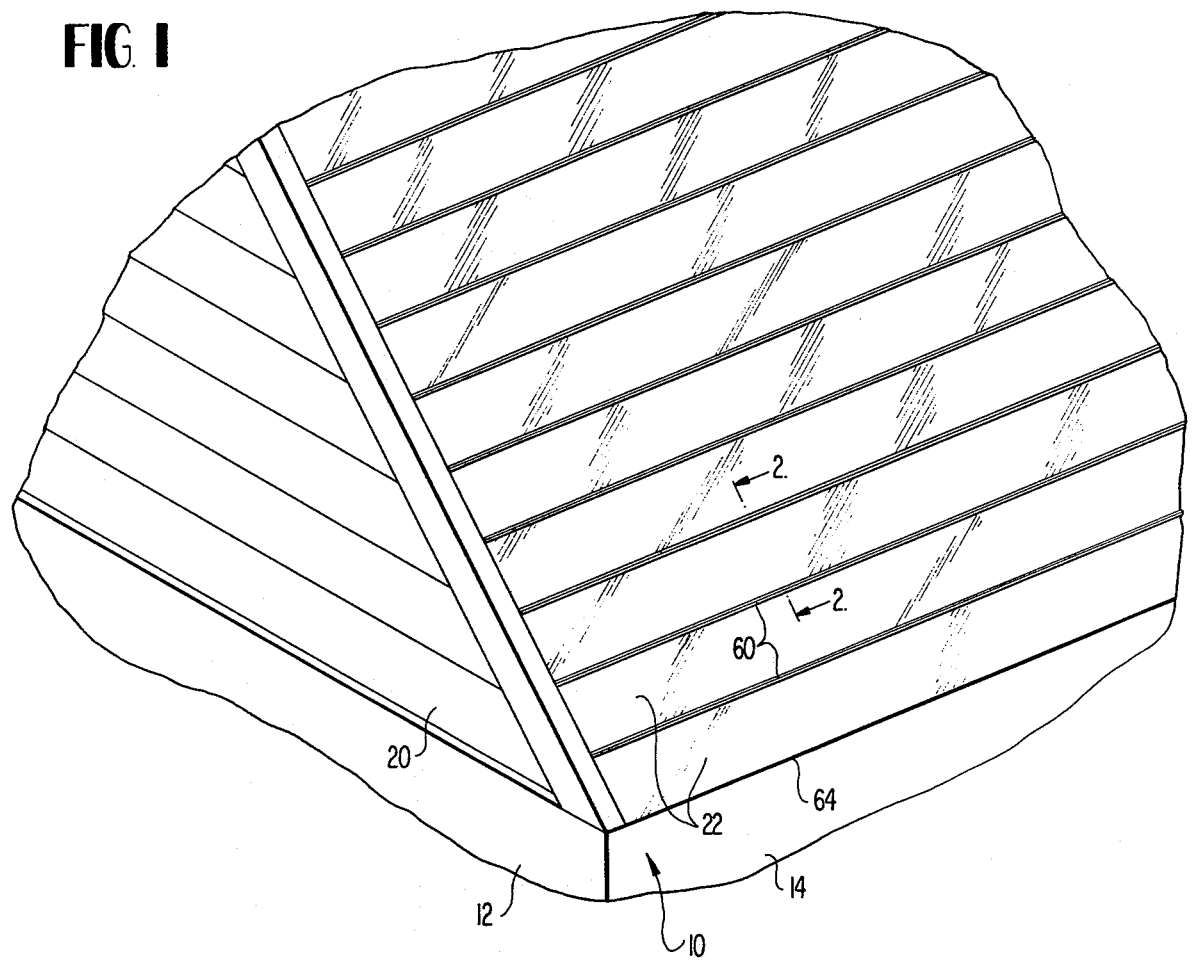
FIG. 1 is a perspective view of a part of a building roof structure employing the extruded metal solar collector roofing shingles in one form of the present invention.
Figure 2:
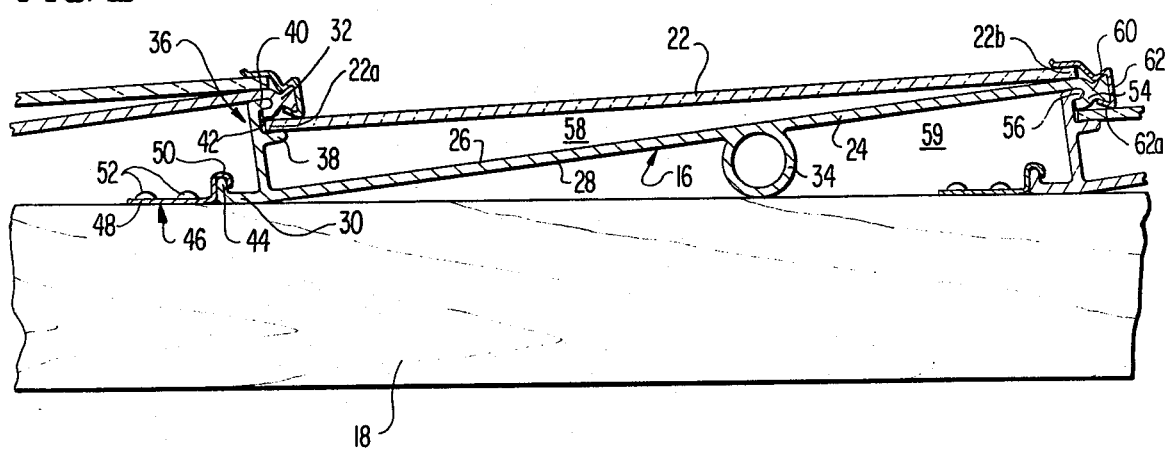
FIG. 2 is a sectional view of a portion of the roof structure of FIG. 1 taken about line 2—2.

Referring to FIGS. 1 and 2 of the drawings, a building structure such as a home dwelling unit and indicated generally at 10, comprises an end wall 12 and a sidewall 14 supporting an overlying roofing structure which may constitute a conventional hip roof or the like and which roof is slanted or inclined with respect to vertical walls 12 and 14. Instead of cedar shakes, asbestos shingles, or a laid up asphalt and tar roof, the present invention employs a plurality of extruded metal solar collector roofing shingles indicated generally at 16, FIG. 2, which are directly mounted in multiple shingle, overlapping edge fashion to rafters 18. Rafters 18 form an open, inclined framework and are laterally spaced to support the longitudinally extending shingles 16, FIG. 1, that is, the rafters 18 underlie the shingles 16 at laterally spaced positions from gabled end 20 of the building 10 to the right, FIG. 1.

Only one of the rafters 18 is shown in FIG. 2, and unlike conventional building construction, there is no necessity for applying plywood or other sheet material to the rafters to act as a support for conventional roofing shingles such as asphalt. The present invention simply fixedly mounts the solar collector shingles 16 of the present invention directly to the rafters as seen in FIG. 2. Underlying insulation is necessary and may be placed between the rafters or laid on top of the rafters between the rafters and the shingles.

Each shingle in the first embodiment carries on its outer face and overlying the same, a light transmissive plate 22 such that the shingles 16 formed of extruded metal such as aluminum, which is a good heat conductor, absorb sufficient solar radiation. The light transmissive plates 22 minimize loss of heat collected through radiation, convection and conduction. Shingle 16 comprises primarily an elongated planar sheet or strip portion 24 of rectangular plan configuration having an upper or outer surface 26 and a lower or inner surface 28 relative to the building 10, and an upper edge 30 and a lower edge 32 in terms of vertical height for each of the shingles 16 when inclined on the rafters 18. The upper edge 30 of each shingle underlies the lower edge 32 of the adjacent shingle in a direction towards the top of the roof for the multiple shingle array and define in this case a composite solar panel covering one complete side of the roof which side generally faces the sun.

As mentioned previously, each metal shingle 16 is formed of metal preferably aluminum, by conventional extrusion process. The solar energy absorbed by the planar sheet portion 24 by impact of the sun's rays on the upper surface 26 of the shingle is transmitted by conduction to an integral tube or pipe 34 which lies intermediate of edges 30 and 32 and which projects outwardly from the lower surface 28 of the shingle. The tubes 34 extend the full length of the shingles 16 and may be fluid coupled in series or parallel by means (not shown). The tubes carry a gas or liquid which is circulated through the pipes 34 for picking up the heat from the individual shingles and transmitting that heat to an end use device by raising the temperature of the liquid or gas passing therethrough. An air space between the shingles and the insulation is created by the sagging of the insulation between rafters or by mounting spacing blocks between the rafters and each mounting clip. The air space between the shingles and the insulation may be collected at the top of each column of air and transmitted to a heat storage area or transmitted directly into the building to be heated or to a clothes dryer or similar appliance which uses hot air.

The solar collector roofing shingles therefore act as a heat exchanger between the sun's rays and the fluid carried by the pipes 34 or the air within the space below the collector. The integral tube or pipe 34 prevents the bottom surface 28 of the shingle from lying flush with the outer edge of the rafters 18 to which it is mounted, and thus the planar sheet portion 24 is inclined relative to the rafters 18. The upper edge 30 of the shingle includes an integral outwardly projecting, first projection indicated generally at 36 which is F-shaped in cross-section facing lower edge 32 including a lower edge 38 and an upper ledge 40 which form an elongated slot or groove 42 which faces towards the lower edge 32 of that shingle. Further, the upper edge 30 of the shingle 16 terminates in a right angle second projection rim 40 facing outwardly and upwardly of shingle 16 but extending to a height which is much less than that of the first projection 36. The purpose of the second projection or rim 44 is to permit the shingles to be readily mounted to the rafters 18 by way of mounting clips 46. Each clip 46 includes a flat base portion 48 and a U-shaped hook portion 50 which engages the rim 44 of the shingle. By way of mounting screws 52, the base of the clip 46 is fixed to the upper surface of the rafters and locks the shingles to the rafter at this point. Obviously, other mounting means may be employed, such as simply providing holes within the planar sheet portion 24 of the shingle as for instance between the projections 36 and 44 and nailing the shingles to the rafters. The presence of the tube or pipe 34 causes the lower edge 32 of the shingle to stand free of the rafters. Incidentally, under this type of construction, insulation of the roof can be effected by the simple positioning of batt type insulation strips (not shown) between rafters with an air space desirable between it and the lower surface 28 of the shingle. The lower edge 32 of the shingle planar sheet portion 24 has a reverse bend portion 54 directed downwardly towards the lower surface 28 and forming an elongated slot or groove 56 of a width on the order of thickness of the outer ledge 40 of a shingle projection 36. This locks the lower edge 32 of one shingle 16 to the upper edge 30 of the underlying and adjacent shingle downwardly from the top of the roof.

As mentioned previously, it is preferred that the shingle 16 carry a light transmissive plate or sheet 22 formed of glass or plastic or the like which may be translucent or transparent for purposes of minimizing heat loss by convection and radiation from the extruded metal solar collector shingle 16. As shown, each transparent plastic plate 22 is of rectangular configuration and of a size generally equal to that of shingle 16 and each is positioned in overlying fashion on an underlying shingle, that is, facing the upper surface 26 of the planar sheet portion 24 of the shingle. Each plate 22 has an upper edge 22a which lies upon the lower ledge 38 of the F-shaped projection 36, while its lower edge 22b rests upon the lower edge 32 of the shingle 16 and defines a triangular shaped cavity 58 between plate 22 and shingle 16. In order to lock a transparent plate 22 to a shingle, the lower edge 32 of the shingle 16 terminates in a projection 60 which is keystone shaped in transverse cross-section. The projection 60 supports a metal spring of modified U-shape including a keystone shaped base portion 62a and an extended leg 62b whose outer end overlies plate 22 to frictionally press the plate lower edge 22b into contact with shingle 16, while maintaining the upper edge 22a of the plate within groove 42 of projection 36. If desired, the upper surface 26 of the shingle 16 may be suitably painted or otherwise coated with a layer of material capable of improving solar ray absorption by the planar sheet portion 24 of the shingle. Surface 26 may be painted with a selective coating or a black chromium plated foil may be applied with an appropriate adhesive or the surface may be plated. For instance, surface may be painted black. Preferably, the individual shingles 16 are mounted starting at the eave 64 of the roof and moving upwardly interlocked to each other and subsequently the plates 22 are applied to each shingle by way of the metal spring strip 60. The presence of the spring strips or clips 60 and the reverse bend 54 which receives the upper ledge 40 of the upper edge projection 36 acts cumulatively to press the upper edge 22a of the light transmissive plate 22 against the lower ledge 38 of that projection while at the same time the spring strip or clip 60 frictionally locks the lower edge 22b of the plate against the lower end of that shingle.

It is apparent from the above, that the solar collector shingles of the present invention not only have the capability of absorbing heat and transferring it to a storage area by means of the circulation of a fluid such as a gas or liquid through the tube or pipe 34 which is integral with the shingle or by means of the circulation of the air below the shingles, but the degree of absorption and efficiency may be varied by applying a selective coating on the upper surface 26 of the shingle in lieu of a flat black paint previously referred to. While the shingles have been stated as preferably positioned on the slope or side of the roof which faces the sun, such as southern exposure, similarly, the shingles may be used without glazing and selective coating, as a heat rejection area for both night time and those times when the sun is not directly shining on that slope of the roof. Since the planar sheet portion 24 of each shingle is not flush with the rafter or with insulation between rafters, there is created a space 59 beneath each shingle similar in size to cavity 58 in which heat may be collected. The design of the solar collector shingle permits it to have substantial lateral spanning capability with the interlock enabling rain water to run off the roof without entering between shingles. The spanning capability makes it possible not only to eliminate conventional roof sheeting but to reduce the number of roof trusses or rafters 18, reducing substantially the overall cost of the roof structure and also the load which the roof and roof structure places on the bearing walls 12 and 14. This reduction in weight is passed off to the walls and their foundations, reducing the cost of the same. By increasing the thickness of the shingle, the spanning capability can be extended and the shingles may be placed so that they extend from the crest of the roof to the eave.

In an alternate form of the embodiment shown in FIGS. 3 and 4, the building roof structure is comprised of rafters as at 118 which form an open, inclined framework and are laterally spaced to support the longitudinally extending metal solar collector roofing shingles indicated generally at 116 such that the rafters 118 underlie the shingles at laterally spaced positions from upper gabled end at the left toward the lower end of the building roof structure to the right, FIG. 3. The shingles 116 in this case, preferably formed of extruded metal such as aluminum, are mounted at their upper ends (in terms of the slope of the roof structure) by metal mounting clips 100, the roofing structure being further formed by individual light transmissive plates 122 which are of a length and width similar to that of the shingles 116. Further, in this embodiment of the invention, a unitary fiberglass reinforced plastic glazing or sheet 102 extends over a plurality of shingles 116 and light transmissive plates 122, the glazing 102 being mounted to the underlying shingles 116 by way of spring steel clips indicated generally at 160. In similar fashion to the prior embodiment, each shingle 116 includes an integral tube or pipe 134 which lies intermediate of upper edge 130 and lower edge 132 of shingle 116, the tubes projecting outwardly from the lower surface 128 of the shingle. The tubes 134 extend the full length of the shingles 116 and carry a gas or liquid which is circulated through the pipes 134 for absorbing the heat from the individual shingles in the manner of the prior embodiment. The upper edge 130 of the shingle 116 terminates in an outwardly directed projection 135, that is, away from rafters 118, including an offset, a terminal portion 136, forming shelf 138 and carrying a protrusion or ridge 140 just inwardly of edge 142 of that projection. The upper edge 130 of the shingle also integrally carries an inwardly directed projection or flange of L-shaped configuration as at 150, this L-shaped projection 150 being received within a channel or slot 104 formed within the aluminum mounting clip 100. In that regard, the clip 100 carries oppositely directed L-shaped flanges 106 and 108 forming the channel or slot 104, within which resides a plastic insert 152 of modified U-shaped cross-section, which securely receives the L-shaped flange or projection 150, the insert being preferably formed of Teflon or other fluorocarbon containing material and acting as a thermal insulator for greatly limiting heat transfer between the shingle 116 and clip 100. The lower edge 132 of each shingle 116, is integrally provided with a first, inwardly projecting right angle projection 110 at a point just upwardly from its termination, and of said termination a second inwardly directed, but curved projection 112 which is spaced from projection 110 and defines an inwardly facing diverging channel 114, the projection 112 being slightly longer than that of projection 110. Projection 112 terminates in an expanded thickness lip 116 forming a notch 118 on the channel side. Cooperating with the ridge or protrusion 140 of projection 135, projection 110 terminates at its outer edge in a rounded lip or protrusion 120, the thickness of the channel 114 and the positioning and dimensional relations of the rounded lip 120 and the ridge 140 being such that, as may be best seen in FIG. 4, when the shingles are laid from the bottom to the top of the roof with each shingle overlapping the shingle below, a mechanical interlock occurs wherein the channel 114 on the lower edge 132 of the shingle 116 easily slips over the outwardly directed protrusion on the upper edge of the succeeding shingle. This is achieved when the overlying shingle is tilted in a downhill direction which is steeper than that of the lower shingle. The upper edge of the shingle nearest to the crest of the roof is then lowered, causing the ridge 140 of the outward projection 135 to interlock above the rounded lip 120 of lower edge projection 110. The lip 116 of lower edge projection 112 extends outwardly and away from outward projection 135 of the succeeding and lower shingle 116 to prevent water from working back into the interlock area by capillary action and contains the notch 118 which facilitates the securing of the spring steel clips 160 which act to hold the light transmitting plates 122 to the shingles 116 at this point, and in this embodiment of the invention to maintain the fiberglass reinforced plastic glazing or sheet 102 a short distance away from the collector light transmissive plates 122.

In this case, clips 160 are of serpentine configuration including an intermediare U-shaped portion 162 which grips lip 116 and locks to notch 118, a reversely bent U-shaped portion 164 which presses the light transmissive plate 122 against the offset 138 which forms a shelf for reception of the upper end of the light transmissive plate 122, each spring clip 160 including a further reversely bent U-shaped portion 166 at the opposite end which presses the lower edge of a light transmissive plate 122 against the lower edge 126, while at the same time terminating in a flattened portion 168 which contacts the face of the fiberglass reinforced plastic glazing 102. The fiberglass glazing may be attached to the clips 160 by self drilling and threading screws 170. In turn, the aluminum mounting clips 100 may be mounted to the upper edges of the rafters 118 by way of similar self drilling and threading screws 172.

It may be seen from the above, therefore, that the embodiment of the invention shown in FIGS. 3 and 4 is similar to that of FIGS. 1 and 2, with the exception that the Teflon insert permits the metal clips 100 to mount the shingles to the roof rafters. The insert receives the L-shaped projection 150 of shingle 116 to securely hold the same but permit the shingles to expand and contract upon temperature change without placing any stress on the rafters and without making any noise during such expansion and contraction.

It may be further seen that the function of the light transmissive plate 122 formed preferably of conventional glass, is to transmit the solar rays to the aluminum solar collector roof shingle 116. However, the light transmissive plate 122 is opaque to the infrared rays and the collector panel radiates only in the infrared range. Further, there is a minimization in the amount of moisture which can penetrate to the collector panel, and even so, the moisture which does penetrate in all of the embodiments of the present invention may freely run off of one shingle onto the upper surface of the light transmissive plate or glazing on top of the next shingle below the same. Preferably, the present design facilitates the replacement of broken glass and facilitates the use of small pieces of glass which are much easier to handle and much less expensive to replace when broken. The fiberglass reinforced plastic glazing or sheet 102 may be provided in sheet form of 4 to 5 feet in width which may run the entire length of the roof, thereby eliminating all seams except the overlapping of one strip of glazing on top of the other in customary shingle fashion.

In that respect, in the alternate embodiment of FIG. 5, wherein like elements are provided with like numerals with respect to the embodiment of FIGS. 3 and 4, the spring clip 160' is provided with a U-shaped portion 162' embracing projection 112 of shingle 116, a reversely bent portion 164' which presses against the upper surface of the succeeding or lower light transmissive plate 122, a U-shaped reverse bent portion 166' which grips the upper edge of the lower fiberglass reinforced plastic glazing or panel 102' and finally a U-shaped terminal portion 174 which grips the lower edge of the partially overlying fiberglass reinforced plastic glazing 102' in the direction of the roof crest. In all other respects, the embodiment of FIG. 5 is similar to that of FIGS. 3 and 4 and its method of erection and use is identical thereto, obviously there being no screws 170 to couple or fixedly mount the glazing to the spring clip.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An extruded metal solar collector roofing shingle for mounting in multiple shingle, edge overlapping, parallel array fashion across laterally spaced inclined roof rafters of a building structure or the like, said shingle comprising:
    an elongated planar sheet portion, having upper and lower surfaces and laterally opposed upper and lower edges, said upper surface facing away from the building,
    integrally extruded fluid conduit means within said sheet portion and protruding from said lower surface, and
    integrally extruded interlocking means along opposed lateral edges of said sheet portion for forming a mechanical interlocking connection between overlapping edges of respective sheet portions of adjacent shingles.

2. The solar collector roofing shingle as claimed in claim 1, wherein a light transmissive plate of rectangular configuration and of a size generally equal to that of the shingle, is mounted to the upper surface of said shingle and spaced therefrom to reduce loss of heat from the shingle.

3. The solar collector roofing shingle as claimed in claim 1, wherein the upper edge of the planar sheet portion of each shingle comprises an integral first projection which projects outwardly therefrom and includes an elongated first groove facing towards the shingle lower edge, the upper edge of said light transmissive plate is carried thereby, and spring clip means carried by said lower edge of said planar sheet portion of said shingle and frictionally gripping the lower edge of said light transmissive plate to maintain the upper edge within said groove such that water does not penetrate to the collector shingle planar sheet portion.

4. The solar collector roofing shingle as claimed in claim 3, wherein said first projection is F-shaped in lateral cross-section facing in the direction of the lower edge of said planar sheet portion, upper and lower right angle ledges from said elongated first groove and the lower edge of said shingle planar sheet portion comprises a reverse bent U-shaped portion defining an elongated second groove which receives the upper flange of the F-shaped first projection of the adjacent shingle to form said interlocking means between respective shingles.

5. The solar collector roofing shingle as claimed in claim 4, wherein said spring clip means comprises a metal spring strip of modified U-shape in cross-section which engages said reverse bent portion of the lower edge of said shingle planar sheet portion and having a leg frictionally engaging the upper surface of the lower edge of said light transmissive plate to press the lower edge of said light transmissive plate against the lower edge of said shingle planar sheet portion and to maintain the upper edge of said light transmissive plate within said groove of said F-shaped first projection and to form a cavity between said light transmissive plate and said planar sheet portion which is triangular in cross-sectional configuration.

6. The solar collector roofing shingle as claimed in claim 5, wherein the upper edge of said shingle planar sheet portion terminates in a right angle upwardly directed second projection such that mounting clamps fixed to the upper edge of said rafters terminating in a U-shape may receive said second projection to fixedly mount the upper edge of said planar sheet portion in contact with said rafters, and wherein said fluid conduit means lies intermediate of said upper and lower edges of said planar sheet portion to incline said planar sheet portion outwardly of said rafters in a direction toward said lower edge.

7. The solar collector roofing shingle as claimed in claim 1, wherein the upper edge of said planar sheet portion of each shingle comprises an integral first projection which projects outwardly therefrom and includes in a protruding ridge on its face, facing away from the lower edge of said shingle, said ridge lying inwardly of the edge of said integral first projection, and the lower edge of said planar sheet portion comprises a pair of spaced inwardly directed projections defining a narrow diverging channel, and wherein the upper of the two inwardly directed projections at said lower edge terminates in a rounded protruding lip; whereby, a lower edge of one shingle may be tilted outwardly of the inclined building roof rafters to permit the protruding ridge of said first projection of another shingle to pass beyond the rounded lip and to be locked thereby upon pivoting of said one shingle towards said inclined roof rafters.

8. The solar collector roofing shingle as claimed in claim 7, further comprising a light transmissive plate of rectangular configuration and of a size generally equal to that of the shingle, said first projection includes an offset defining a shelf for one end of said light transmissive plate, the other end of said light transmissive plate rests on the upper surface of said shingle elongated planar sheet portion and spring clip means carried by the lower edge of the planar sheet portion of said shingle and frictionally gripping the inwardly directed projection most remote from said first projection frictionally presses the lower edge of said light transmissive plate against the lower edge of said shingle and said spring clip means further comprises means for resiliently pressing the upper edge of said light transmissive plate against the shelf of the succeeding lower shingle.

9. In combination, an improved roof structure for a building or the like, said building comprising:
vertical sidewalls and a plurality of laterally spaced, upwardly inclined rafters mounted to said sidewalls,
a plurality of extruded metal solar collector roofing shingles mounted in overlapping edge, parallel array fashion across said laterally spaced inclined rafters,
each shingle comprising an elongated planar sheet portion having upper and lower surfaces and laterally opposed upper and lower edges, said upper surface facing away from the building interior,
said shingles each including an integrally extruded fluid conducting tube extending longitudinally of said planar sheet portion and projecting from the lower surface thereof, and
integrally extruded interlock means incorporated within the opposed lateral edges of said planar sheet portions to mechanically interlock the overlapping edges of respective sheet portions of adjacent shingles.

10. The combination as claimed in claim 9, further comprising light transmissive plates of rectangular configuration and of a size generally equal to that of said shingles, and means for mounting a light transmissive plate to the upper surface of each of said shingles and spaced therefrom at least along one of said laterally opposed edges.

11. The combination as claimed in claim 10, wherein said interlocking means comprises an integral projection projecting outwardly from the upper edge of each shingle and defining a ledge facing towards the lower edge of that shingle and a reversely bent portion of the lower edge of the shingle directed downwardly of the bottom thereof and defining an elongated groove for receiving a ledge of the adjacent shingle.

12. The combination as claimed in claim 9, wherein said interlocking means comprises an integral projection projecting outwardly from the upper edge of each shingle and including a protruding ridge on the face of said projection facing away from the lower edge of said shingle and first and second inwardly directed projections projecting from the lower edge of each shingle and defining a narrow diverging channel, and wherein the inwardly directed projection at the lower edge of said shingle on the upper side of said channel terminates in a rounded protruding lip with said ridge and said protruding lip being positioned such that upon tilting of the shingle away from the rafters of said building, the protruding ridge is positioned within said channel internally of said projection protrusion lip; thereby locking respectively the lower edges of given shingles to the upper edges of succeeding shingles.

13. The combination as claimed in claim 12, wherein said first integral projection at the upper edge of each shingle is offset to form a shelf, light transmissive plates of rectangular configuration of a size generally equal to that of the shingle are provided for each shingle and the upper edge of said light transmissive plate is positioned on said shelf and the lower edge of said light transmissive plate rests against the lower edge of the outer surface of the outer edge of each shingle, and said combination further comprises spring clip means mounted to the lower projection at said shingle lower edge and resiliently clamping the lower edge of said light transmissive plate to said shingle and resiliently pressing the upper edge of the succeeding light transmissive plate to the shelf of the corresponding succeeding shingle.

14. The combination as claimed in claim 12, wherein said shingles each comprise an inwardly directed L-shaped projection at the upper edge thereof, and a metal mounting plate is fixed to the surface of said rafter and includes a slot for receiving said L-shaped projection of said shingle, and a Teflon insert is carried within said metal clip slot between said L-shaped projection of said shingle and said clip to permit said shingle to thermally expand and compress without generation of noise, and thermally isolate said shingles from said building structure rafters.

15. The combination as claimed in claim 12, further comprising at least one fiberglass reinforced plastic glazing sheet overlying a plurality of said collector shingles and wherein said spring clip means further comprises means for coupling said glazing sheet overlying to said shingle, but spaced therefrom.

16. The combination as claimed in claim 15, wherein said glazing sheets are plural in number and overlap at their edges and said spring clip means includes means for frictionally gripping the overlapped edges of said plural glazing sheets at said overlap.

* * * * *